Jan. 2, 1951     W. R. HOFMANN     2,536,935
ROTARY EXTRACTOR Filed May 9, 1947     6 Sheets-Sheet 1

FIG. 1

WERNER R. HOFMANN
INVENTOR

BY

ATTORNEY

Jan. 2, 1951 W. R. HOFMANN 2,536,935
ROTARY EXTRACTOR
Filed May 9, 1947 6 Sheets-Sheet 2

WERNER R. HOFMANN
INVENTOR
BY

ATTORNEY

Jan. 2, 1951  W. R. HOFMANN  2,536,935
ROTARY EXTRACTOR
Filed May 9, 1947  6 Sheets-Sheet 4

FIG. 10

WERNER R. HOFMANN
INVENTOR

BY
ATTORNEY

Patented Jan. 2, 1951

2,536,935

UNITED STATES PATENT OFFICE 2,536,935

ROTARY EXTRACTOR

Werner R. Hofmann, Bloomington, Calif., assignor to Food Machinery and Chemical Corporation, San Jose, Calif., a corporation of Delaware Application May 9, 1947, Serial No. 747,115

12 Claims. (Cl. 100—39)

This invention relates to an apparatus for the extraction of liquids such as juice and rind oils from whole fruits and is particularly useful in the extraction of such liquids from citrus fruit.

In a co-pending application, Serial No. 544,424, of Wilbur A. Pipkin, an extraction apparatus having this general purpose is disclosed.

It is an object of this invention to provide an improved extraction apparatus employing the same basic principles as the apparatus disclosed in the said co-pending application.

Another object is to provide a Pipkin type extractor having an improved means for removing the fruit carcasses from the compression cups following the extraction step.

The manner of accomplishing the foregoing objects as well as further objects and advantages will be made manifest in the following description taken in connection with the accompanying drawings in which.

Referring specifically to the drawings, the invention is there illustrated as embodied in a juice and peel oil extractor 20. The feed side of this extractor is shown in vertical section in Figs. 3, 10 and 11, it being understood that the portion of the extractor on the other side of the center line 21 is omitted from these views.

The extractor 20 has a circular base 22 which is preferably cast integral of aluminum. This base has a lower outer wall 23 from which an annular horizontal wall 24 extends inwardly, a conical wall 25 rising from the inner edge thereof to a base rim 26, the latter being provided near the outer edge thereof, with an annular oil retaining flange 27. The portion of the wall 23 which extends above the wall 24 and an annular wall 28 unite to form an annular juice trough 29 and an annular oil trough 30.

A port 32 in the wall 23 provides an outlet for oil from the trough 30 and a pipe 33 connecting with a passage 36 provided in a boss 37, cast integral with the walls 23 and 24 (see Fig. 2), provides an outlet from the juice trough 29.

The wall 28 is provided with an annular sheet metal extension sleeve 38 which is frictionally held in place by springs 39 for the purpose of extending the wall 28 upwardly during the operation of the extractor 20 while permitting the sleeve 38 to be slipped downwardly outside of the wall 28 to give access to the trough 29 for cleaning purposes when the machine is stopped.

Figures 2, 3, 4, 5:
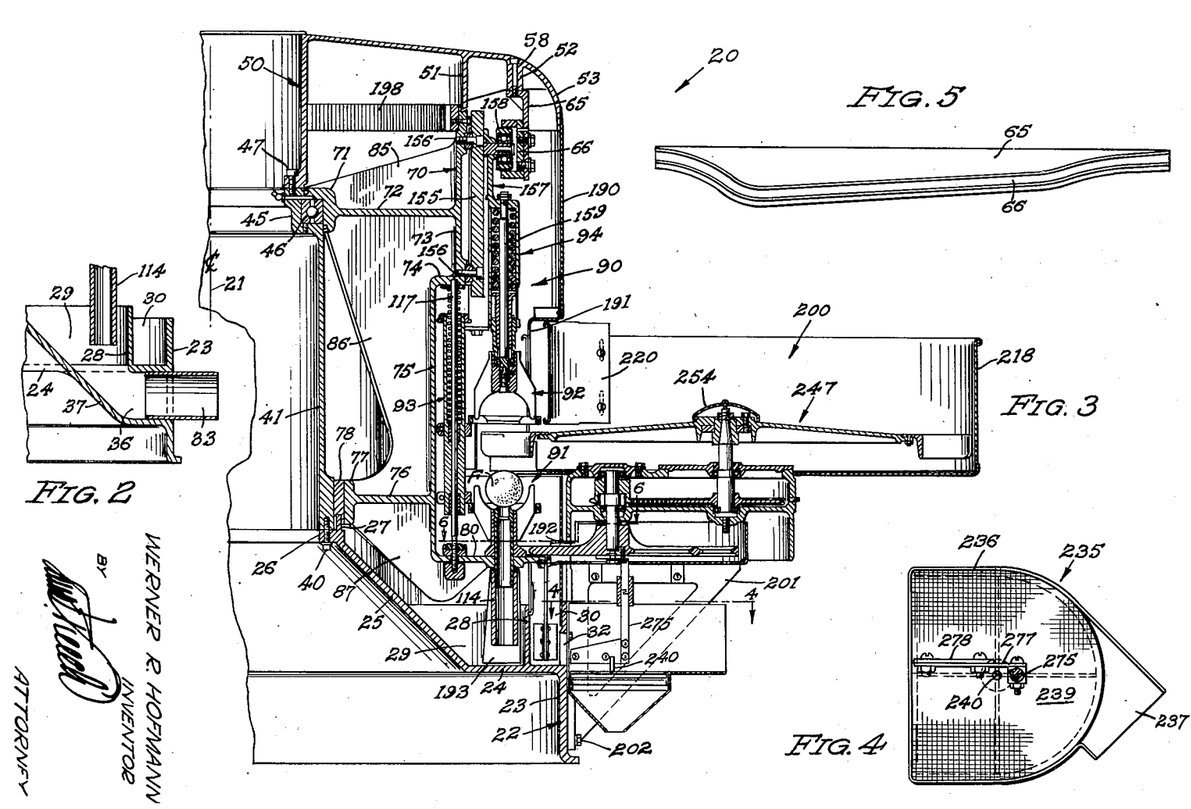
Fig. 2 is a fragmentary sectional view taken on the line 2—2 of Fig. 1 and shows the juice outlet of the invention.
Fig. 3 is a fragmentary vertical sectional view taken on the line 3—3 of Fig. 1 and illustrating the apparatus of the invention at the instant a piece of citrus fruit is fed downwardly into the lower of two compression cups which subsequently cooperate in extracting juice and peel oil from this piece of fruit.
Fig. 4 is an enlarged plan view of the peel oil finisher taken on the line 4—4 of Fig. 3.
Fig. 5 is a development at a reduced scale of the extraction unit operating cam of the invention.
Figure 10:
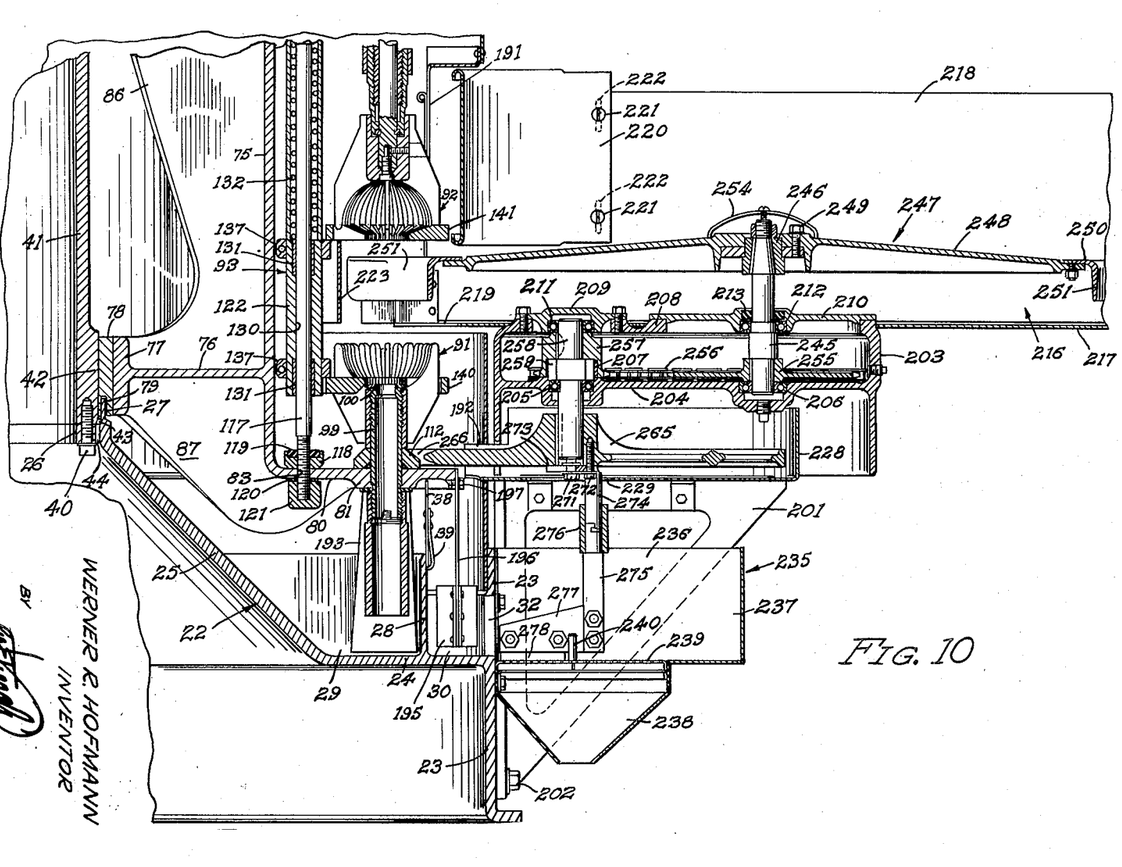
Fig. 10 is an enlarged fragmentary view of a lower portion of Fig. 3.
Figure 11:
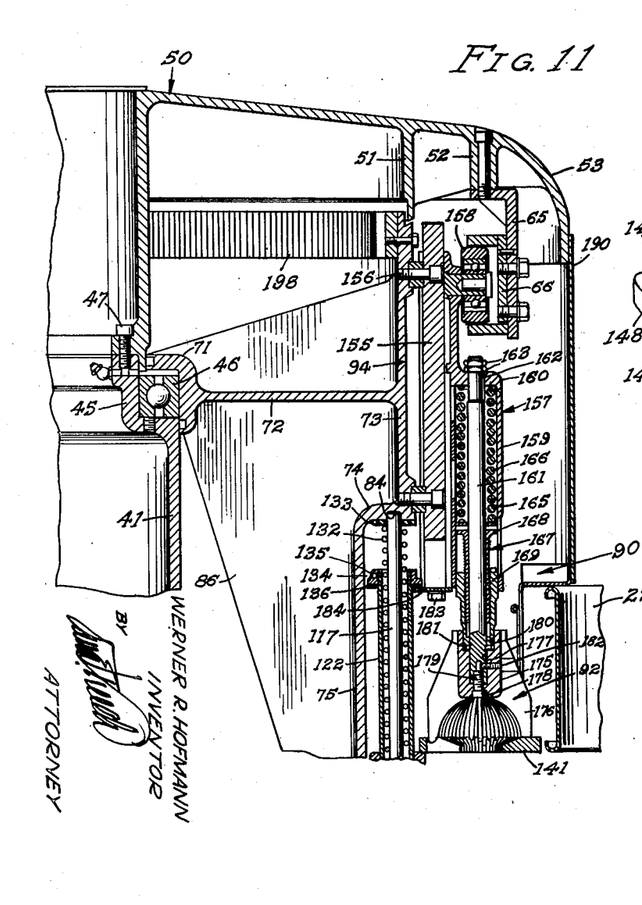
Fig. 11 is a fragmentary enlargement to the same scale of an upper portion of Fig. 3.

Supported concentrically on the base rim 26 and secured thereto as by cap screws 40 is a hollow column 41 (Figs. 3 and 10). This column has a heavy journal 42 at its lower edge which is spaced inwardly from the flange 27 to provide an annular oil trap 43, this trap being vented to the interior of the hollow base 22 by vent holes 44. Provided on the upper end of the column 41 is a rim 45 in which is mounted a heavy ball bearing 46. Supported on the rim 45 and secured thereto as by cap screws 47 is a cam supporting cap 50. This cap has annular walls 51 and 52, extending downwardly therefrom, and the periphery of the cap bells downwardly to form a skirt 53.

Mounted on top of the cap 50 is a drive motor 54 which is geared to a pinion 55 (Fig. 1) which extends vertically down within the cap. The cap 50 also supports a switch 56 for controlling the motor 54 and a lubricating pump 57, by which the extractor 20 is oil lubricated.

Fixed by cap screws 58 to the lower edge of the wall 52 of the cap 50 is an annular cam support 65 on which an annular channel cam 66 is fixed. A development of this cam, seen from the inside, is illustrated in Fig. 5.

Rotatably mounted on the column 41 is a rotor 70 which is also preferably cast in one piece out of aluminum. This rotor has a hub 71 which rests upon the bearing 46 and supports the rotor. A disk 72 connects the hub with a vertical annular wall 73.

The lower end of the wall 73 connects through a narrow horizontal wall 74 with an annular wall 75 of slightly less diameter, the latter being connected through a disk 76 with a hub 77, having pressed therein a bearing bushing 78. This bushing bears against the journal 42 and has an annular groove 79 which fits over the base flange 27. Thus any oil escaping downwardly between the bushing 78 and the journal 42 collects in the bottom of the oil trap 43 and escapes therefrom through the vent holes 44. The admission of lubricating oil into the juice trough 29 is thereby prevented.

Formed integral with and extending outwardly from the lower edge of the wall 75 is an annular platform 80, the under surface of which is provided with an annular boss 81. The boss 81 is provided with 24 circumferentially and equally spaced holes 82. The platform 80 has the same number of smaller and similarly spaced holes 83 while the wall 74 has blind holes 84 which are in alignment respectively with the holes 82.

The disks 72 and 76, walls 73 and 75, and the platform 80 of the rotor 70 are strengthened and united into a rigid assembly by circumferentially spaced radial ribs 85, 86 and 87.

Figure 14:
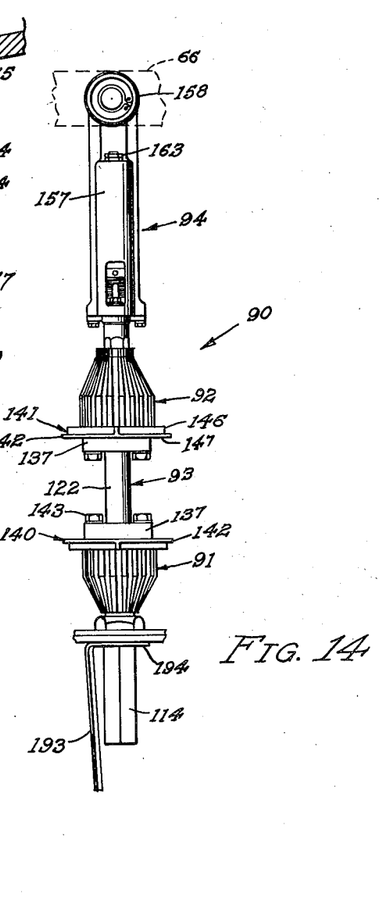
Fig. 14 is a diagrammatical front elevational view of one of the fruit compression units of the invention approximately of the same scale as Fig. 9 and with the parts thereof similarly positioned, i. e.: with the upper cup and the ejector assembly in their uppermost positions.
Figure 15:
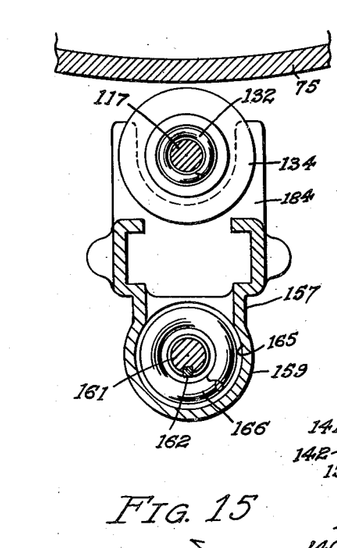
Fig. 15 is an enlarged horizontal sectional view taken on the line 15—15 of Fig. 8 to illustrate the construction of the cross head on which the upper cup is mounted and the ejector lifting plate provided on said cross head.

Mounted on the rotor 70 is a series of 24 extraction units 90 (Figs. 3 and 14). As these units are identical in construction, a description of one will suffice for all. Each of these units includes a lower compression cup 91, an upper compression cup 92, a carcass ejecting or stripping mechanism 93, and an operating mechanism 94. The latter mechanism functions to reciprocate the upper cup 92 relative to the lower cup 91 to envelop and compress a whole citrus fruit between the cups so as to extract the juice and rind oil separately from this fruit. It also functions to reciprocate the ejector 93 so as to strip the fruit carcass resulting from said compression from both cups 91 and 92 to facilitate the discharge of the carcass from the extractor 20.

Figure 13:
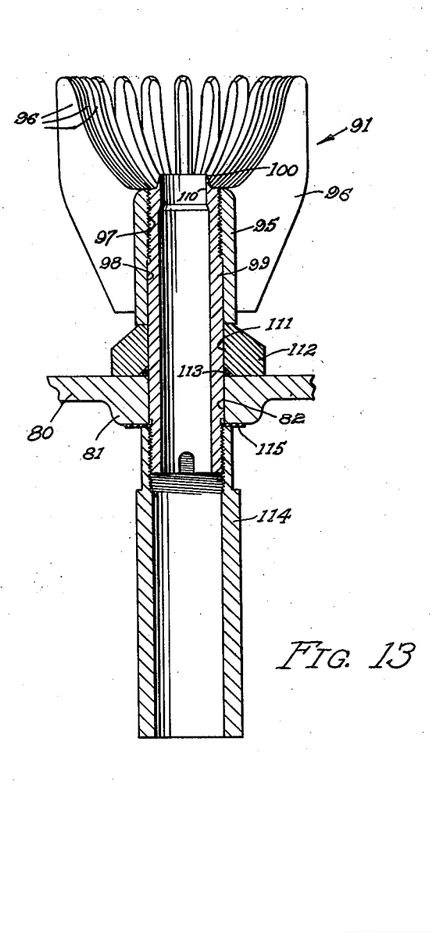
Fig. 13 is a diagrammatical vertical sectional view taken on the line 13—13 of Fig. 1 with the stripper omitted for the purpose of illustrating the structure of one of the lower compression cups of the invention.

The lower cup 91 has a tubular body 95 with which a series of 25 fingers 96 are cast integral so as to extend radially outwardly from said body (Fig. 13). Body 95 has a threaded bore 97 and a smooth counterbore 98. A knife tube 99 which is externally threaded at its upper end to screw into the bore 97, is provided with an upwardly extending short circular knife 100. The knife 100 has a bore 110 which is relatively short and somewhat smaller than the interior diameter of the tube 99 for a reason which will be made clear hereinafter.

Figure 12:
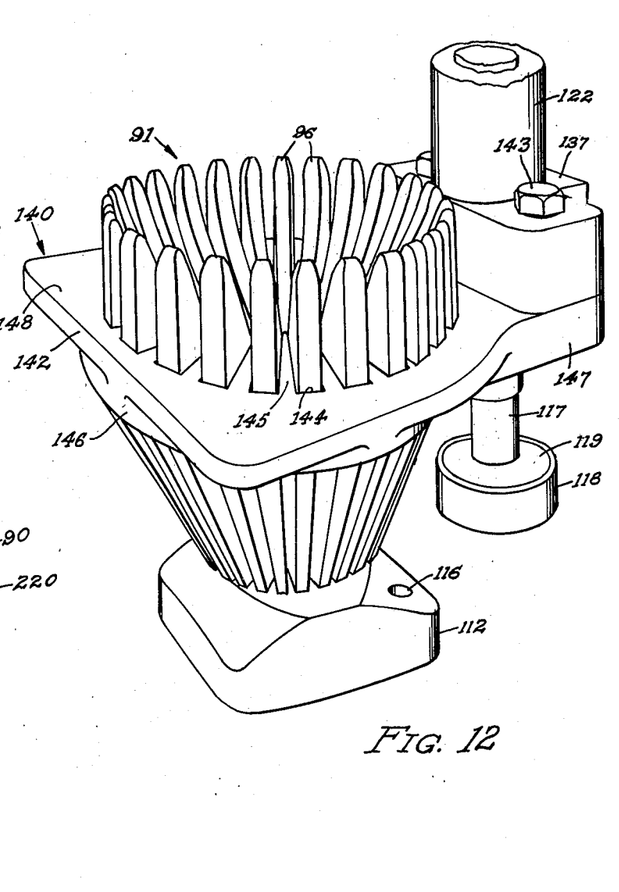
Fig. 12 is a diagrammatical perspective view of a lower cup of an extraction unit of the invention with the carcass stripper halfway between its uppermost and lowermost positions to show how the radial picks of the stripper extend inwardly through the slots between adjacent fingers of this cup.

The unthreaded portion of the tube 99 snugly fits the unthreaded counter-bore 98 of the cup body 95 and extends downwardly therefrom through a hole 111 formed in a large gear tooth 112, the lower end of said hole being bevelled to receive a rubber packing ring 113. The tube 99 then extends downwardly through one of the holes 81 of the rotor and is externally threaded at its lower end to receive a relatively long tubular nut 114 which tightens against a gasket 115 and thus rigidly fixes the cup 91 on the rotor platform 80. The gear tooth 112 is properly oriented by pin 116 (Fig. 12) which passes through this tooth and into a suitable hole provided therefore in the platform 80 so that this tooth will be properly related to the other identical teeth of the other units 90 to constitute a driving gear for the feeder of the extractor 20 as will be made clear hereinafter.

The ejector 93, of the unit 90 being described, is mounted on a fixed shaft 117, the upper end of which fits into one of the blind holes 84 and the lower end of which is of reduced diameter, is threaded and extends downwardly through the corresponding hole 83. Screwed onto the lower threaded end of the shaft 117 and then turned down against the platform 80 to support this shaft in place, is a nut 118, the upper face of which is hollowed out to receive a rubber cushion 119. Tightened up on the lower end of the shaft 117 against a gasket 120, is a cap nut 121 which acts as a lock nut to prevent the unscrewing of the nut 118 and forms an effective liquid seal about the shaft 117 where this passes through the hole 83.

Slideable vertically on the shaft 117 is a tubular ejector body 122 having a bore 130 which is counter-bored to receive bushings 131 and then further counter-bored in an upper portion thereof to receive a coil spring 132, the upper end of which bears against and holds a rubber cushion ring 133 in place against the wall 74. The upper end of the tubular body 122 is threaded and has screwed thereon a split nut 134 which is fixed against rotation by tightening a bolt 135 with which this is provided.

Surrounding the tube 122 just beneath the nut 134 is a rubber cushion ring 136 which retains itself in this position by contracting on the tube 122. Rigidly applied to the tube 122 are split clamps 137 of lower and upper strippers 140 and 141. These strippers are identical and preferably dye cast from the same mold so a description of one will suffice for both. Stripper 140, for instance, comprises a horizontal plate 142 which is secured to its clamp 137 by cap screws 143. The plate 142 has such a pattern removed therefrom vertically clear through said plate so as to provide an annular series of slots 144 uniting with a central open space and leaving a series of radial inwardly projecting picks 145. The slots 144 and picks 145 are so located and formed that the plate 142 is adapted to freely slide upwardly or downwardly over the lower cup 91. The slots 144 thus snugly receiving the cup fingers 96 while the picks 145 are snugly received in the slots between the fingers 96. The plate 142 surrounding the circle in which the slots 144 are formed is reinforced by a ring 146 from which the picks 145 extend inwardly, and an attachment lug 147 where the plate 142 attaches to the split clamp 137. The upper face 148 of the plate 142, however, is preferably flat and wedge-shaped so that when the plates 142 of the ejector 93 of adjacent units 90 are on the same level, the adjacent edges of these plates are disposed close to each other and form, in effect, a practically continuous flat horizontal surface.

While the stripper 141 is identical with the stripper 140, it is inverted relative to the latter so that the flat face 147 of the stripper 141 is disposed downwardly.

The operating mechanism 94 (Fig. 11) of the unit 90, being described, includes a rectangular slide bar 155 which is fixed as by cap screws 156 to the outer face of the rotor wall 73. Vertically slideable on this bar is a cross head 157 on the upper end of which is mounted a ball bearing roller 158 which extends into the cam channel track 66 and on the lower portion of which is provided a spring housing 159, the head 160 of which has a hole in which is received the upper threaded end of a shaft 161, this shaft being keyed in place in said hole by a key 162 and nuts 163 are applied to the shaft to prevent the latter being pulled downwardly through said hole. The housing 159 has a cylindrical bore 165 in which a coil spring 166 is trapped by an expansion jack 167, the latter including an upper male threaded member 168 and a lower female threaded member 169.

The upper cup 92 has a body 175 and fingers 176, the outer surfaces of which are identical with the outer surface of the body 95 and the fingers 96 of the lower cup 91, and, in manufacturing, these two cups are initially cast from the same mold. After being cast, however, the body 175 is finished by machining differently than the body 95 of the lower cup. Thus, the body 175 (Fig. 11) is provided with two bores 177 and 178 which are joined by a hole adapted to receive a cap screw 179, the head of the latter fitting into the bore 178 so as to be flush with the bottom of the cup 92. The bore 177 has a counter-bore 180 into which the lower end of the female member 169 fits while the shaft 161 extends downwardly beyond the lower end of said member and into the bore 177 in which it is held by the screw 179 screwing into a tapped hole in the lower end of this shaft. The pressure of the expansive force of the spring 166 tending to hold the shaft 161 downwardly (with the nuts 162 against the head 160) is applied between said head and the shaft through a split ring 181 which extends into a suitable channel turned in the shaft 161 and is trapped therein by being enclosed in an annular recess formed in the lower end of the female member 169.

The screw 179 is locked against accidental removal by a set screw 182 extending inwardly through the cup body 175 and shaft 161 into contact with an upper end portion of said screw.

Fixed on the lower end of the screw head 157 by cap screws 183 is an ejector lifting plate 184 which is in the form of a fork which straddles the tubular ejector body 122 and when the cross head 157 is lifted in raising the upper cup 92 following the compression operation, the fork 184 engages the rubber cushion ring 136 to lift the ejector 93 to cause the latter to function in a manner which shall be made clear hereinafter.

The extractor 20 has a sheet metal housing wall 190 which is formed in sections so as to be readily removable and which covers the space between the lower edge of the skirt 53 of the cap 50 and the upper edge of the outer base wall 23. The housing 190 has a feeder opening 191 formed therein and an opening 192 for the accommodation of a feeder drive gear to be described hereinafter.

In order to keep the pulp from accumulating in the juice trough 29, one or more of the units 90 is provided with a plough 193 which is made of sheet metal bent to provide an attaching plate 194 having a hole therein so that this will slip over the lower end of the cutter tube 99 of that unit and be secured in place by having the nut 114 tightened thereagainst as shown in Fig. 14.

A similar plough 195 is provided to operate in the oil trough 30, this plough being fixed on the lower end of a plate 196 which is secured to the outer edge of the rotor platform 80 as by cap screws 197 (see Fig. 10).

Fixed on the inside of the upper edge portion of the rotor wall 73 is an internal ring gear 198 with which the drive pinion 55 of the motor 54 meshes so that when this motor is energized the rotor 70 is rotated by this motor.

The extractor 20 has an individual fruit feeder 200 which is supported on a pair of brackets 201 secured as by cap screws 202 to a flattened portion of the vertical wall 23 of the extractor base 22 (Figs. 3 and 10). Resting on and secured to the brackets 201 is a feeder transmission casing 203 having a horizontal bottom bearing wall 204 in which are provided bearings 205 and 206. Wall 204 is apertured concentrically with the bearing 205 and provides an oil retaining flange 207 which extends upwardly from said wall and encircles said bearing. An upper casing wall 208 carries cap plates 209 and 210 which provides respectively bearings 211 and 212. The plate 210 is apertured concentrically with the bearing 212 and has a packing ring 213.

Supported on the casing 203 is a feed hopper 216 having a floor 217 and a circular side wall 218 rising upwardly from the periphery of the floor. The floor 217 extends inwardly through the housing opening 191 and has a fruit discharge hole 219, the purpose of which will be made clear hereinafter. Opposite ends of the side wall 218 terminate at the housing opening 191. The free ends of the wall 218 are connected together by a baffle wall 220 which is secured to the wall 218 by wing nut bolts 221 which extend outwardly through vertical slots 222 in the wall 218 so as to permit vertical adjustment of the baffle wall 220 relative to the wall 218. The baffle wall 220 is curved at its ends but is substantially straight otherwise so that it is disposed considerably closer to the center of the hopper 216 than the circular wall 218.

Figure 1:
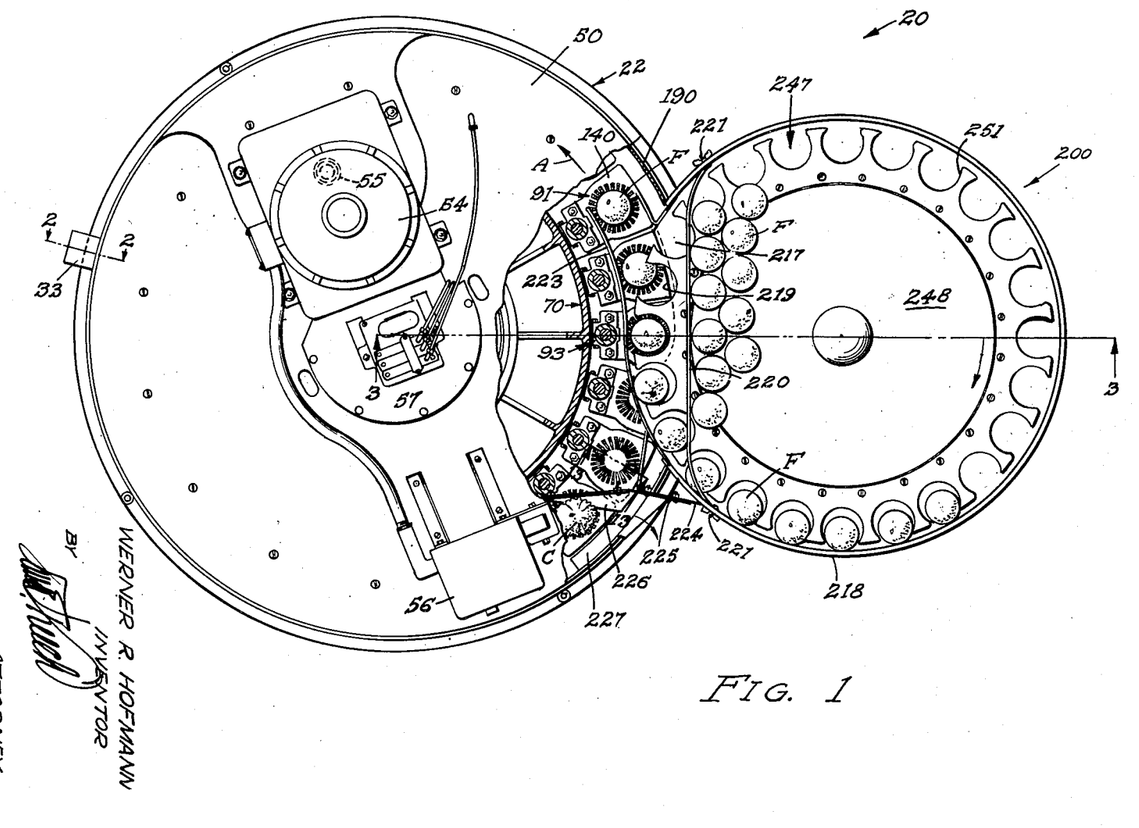
Fig. 1 is a plan view of a preferred embodiment of the invention partly broken away to illustrate the construction thereof, and shows fruit being fed into successive lower compression cups of the extraction apparatus and the ejection of the rind carcass of one of the pieces of fruit at the conclusion of the juice and peel oil extraction operation.
Figures 6, 7, 9:
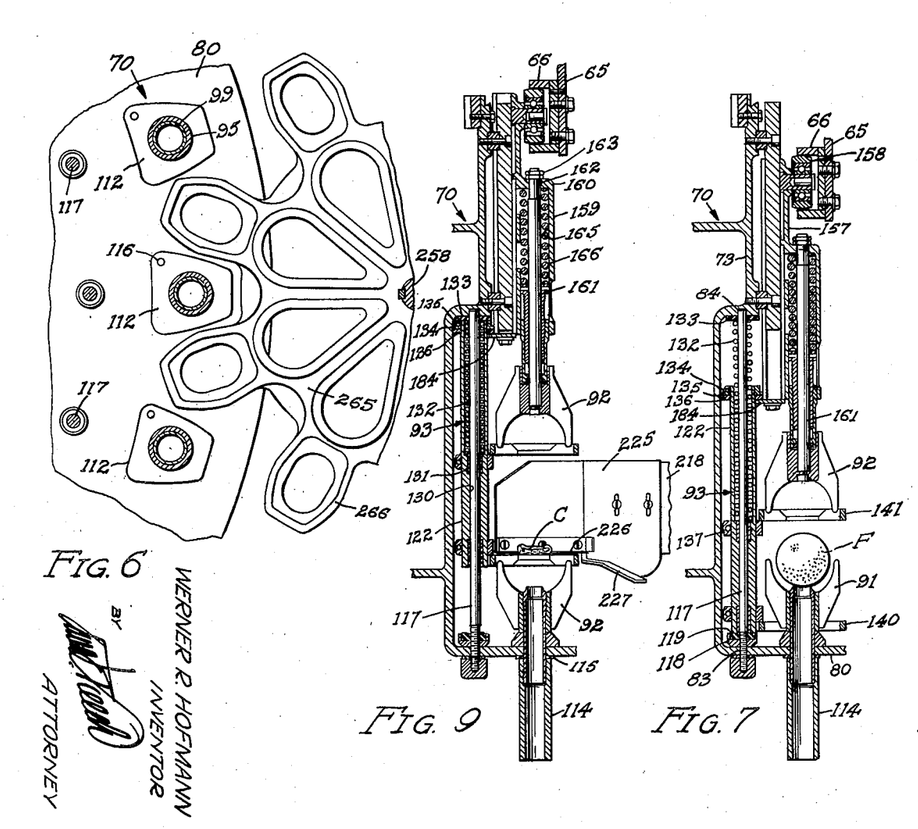
Fig. 6 is an enlarged horizontal sectional view taken on the line 6—6 of Fig. 3 and illustrates the gear connection between the extraction apparatus rotor and the individual fruit feed mechanism.
Fig. 7 is a view of the single extraction unit disclosed in Fig. 3 and at a slightly later point in the cycle of operation thereof in which the upper cup has descended to the point where the ejector assembly has just come to rest in its lowermost position and the upper cup is about to continue downward through the upper stripper and into cooperative fruit compressing relation with the lower cup.
Fig. 9 is a view similar to Fig. 8 and illustrates said extraction unit at a still later point in the operation thereof following the raising of the upper cup of said unit and the lifting of said ejector assembly by said cup whereby the radial picks of the lower stripper raise the carcass of the fruit left in the bottom of the lower cup following said extraction operation, to a level where it is in alignment with a sweep-off blade by which the carcass is deflected out of the machine.

It is to be noted that when the extraction units 90 on the rotor 70 are disposed opposite the feeder 200 the upper cups 92 are retracted upwardly in spaced relation with the lower cups 91 of said unit. Secured to and extending from one of the free edges of the circular hopper wall 218, so as to extend in the same direction as that in which the rotor 70 rotates, is a guide tongue 223 which is formed of sheet metal, the free end portion of this being bent conversely so as to be concentric with the axis of the rotor 70. Secured to the wall 218 and tongue 223 is a sheet metal bracket 224 on which is adjustably fixed a carcass scoop 225, the lower edge of which may be fitted with a shear blade 226 (Figs. 1 and 9). The scoop 225 also has a lip 227 for guiding fruit carcasses outwardly from over a stripper 140 during the operation of the extractor 20.

Secured onto the transmission casing 203 and disposed just beneath this, is a rind oil collecting pan 228 which is formed of sheet metal and has an aperature 229 in the bottom thereof concentric with the bearing 205.

Mounted on the flattened extractor base wall 23 between the feeder supporting brackets 201 is a rind oil finisher 235. This includes a semi-cylindrical box 236 having a pulp discharge chute 237 opening horizontally therefrom and an oil funnel 238 opening downwardly therefrom. Mounted in the mouth of said funnel is a screen 239 which is located below the level of the port 32 in the wall 23 which opens outwardly into the box 236 (see Figs. 3, 4 and 10).

Provided centrally on the screen 239 to extend upwardly therefrom is a pin 240 which forms a handle for said screen whereby the latter may be removed for cleaning. This handle is also located concentrically with bearings 205 and 211 for a reason which will be made clear hereinafter.

Mounted in the bearings 206 and 212 is a shaft 245. This extends upward above the casing 203 into the feed hopper 216 and is tapered to have fixed thereon a hub 246 of a feed wheel 247. This wheel includes a disk-like deck 248 which is removably secured to the hub 246 by cap screws 249 and in turn has removably secured to the periphery thereof an annulus 250 providing a series of pockets 251 comprising recesses which extend vertically through the annulus 250. The pockets 251 are circular and each is adapted to receive a single whole citrus fruit F when this fruit is deposited in bulk in the hopper 216 and deck 248. A number of pieces of fruit are shown resting on this deck in Fig. 1 and certain others where they have rolled from the deck onto the annulus and into certain of the pockets 251. While the pockets 251 in the preferred embodiment, illustrated, open outwardly from the periphery of the annulus 250, it is to be understood that, while this is preferred in handling fruit of a relatively large diameter, the vertical recesses in the pockets 251 may be closed and constitute round vertical holes in the annulus where the latter is formed to handle fruit of relatively medium or small sizes. Covering the hub 246 of the wheel 247 is a cap 254.

Mounted on the shaft 245 within the casing 203 is a sprocket 255 which is connected by an endless chain 256 with a sprocket 257 fixed on a shaft 258 which is supported by end journals in the bearings 205 and 211. The sprocket 257 has a concentric recess 259 which receives the circular oil retaining flange 207 so that oil placed in the casing 203 to lubricate the chain 256 will not be permitted to flow downwardly around the shaft 258.

Fixed on the lower end of the shaft 258 is a gear wheel 265 (Figs. 6 and 10) having teeth 266 which extend between and mesh with the gear teeth 112 provided on the rotor 70 to cause the rotation of the gear in a reverse direction and the transmission of this rotation through the shaft 258, chain 256 and shaft 245 to the feeder wheel 247. The transmission between the rotor and feed wheel is so designed that one of the fruit pockets 251 is brought between and in vertical alignment with the upper and lower compression cups of each of the extraction units 90 as that unit comes opposite the feeder 200.

Secured to the bottom face of the hub of the gear 265 as by cap screws 271 and 272 is a plate 273 on which is fixed an eccentric stub shaft 274. The lower end of this shaft is rabbeted and is united with the correspondingly rabbeted end of the paddle shaft 275 by a sleeve 276. Fixed on the lower end of the shaft 275 is a paddle 277 having a rubber screen wiping blade 278. The paddle 277 is adapted to rotate about the pin 240 and center itself on this when it is rotated by the shaft 274—275 revolving with the gear 265.

When thus rotated, the paddle blade 278 constantly sweeps the screen 239, freeing oil from the pulp delivered through the port 32 onto this screen so that this oil passes through the screen 239 and drains from the hopper 238 into a container provided to receive the same. As the pulp accumulates, this is automatically crowded through the chute 237 into a container provided to receive this or onto a conveyor belt for carrying this away. The same conveyor may, of course, be used to carry away this pulp which conveys off the rind carcasses discharged from the machine by the scoop 225.

*Operation*

The variations in the diameter of citrus fruit commonly met with makes it preferable, in order to operate the present invention with maximum efficiency, to divide the fruit into two or three groups of sizes and then provide an extractor 20 for handling each of these groups in which the cups of the extractor units and the pockets of the feeder are especially dimensioned so that that extractor will efficiently handle any size of fruit within the range of sizes embraced by that particular size group. The extractor 20 is designed to handle medium size fruit.

Before starting operation, the lubricator 57 is supplied with lubricating oil. The juice outlet pipe 33 is connected with a storage means for the juice produced, a means is provided for receiving and storing the peel oil discharged downwardly from the funnel 238 of the finisher 235 and, as previously suggested, a means, such as a conveyor, is provided for carrying away peel oil pulp discharged from the chute 237 and the carcasses deflected from the machine by the scoop 225. Also, of course, a supply of fruit of the sizes within the range which this particular extractor is adapted to handle with maximum efficiency is provided, with means for delivering these by hand or by machine into the hopper 216 so that there will not be any lack of fruit to keep the pockets 251 filled with fruit as these travel into feeding position.

The drive motor 54 is now energized, causing the rotor 70 to be rotated in the direction of the arrow A in Fig. 1 and the feed wheel 247 to be rotated coordinately therewith in the opposite direction so that, as each pocket 251 passes through a plane common to the axes of said rotor and said wheel, this pocket will be in axial alignment with one of the extraction units 90 and disposed between the separated cups 91 and 92 thereof as shown in Figs. 1, 3 and 10. The fruit delivered to the hopper 216 falls on the rotating deck 248, rolls rapidly into the pockets 251 so that each of these contains a whole fruit as it passes under the baffle 220. Pieces of fruit thus delivered to any of the pockets 251 drop downwardly therein and are supported on the peripheral portion of the floor 217. As one of these pockets travels into axial alignment with one of the extractor units 90, it moves out over the hole 219 in the floor 217 and, as the fruit in that pocket is no longer supported, it drops down into the lower cup 91 of that unit, as shown in Fig. 3.

As the unit 90 to which a piece of fruit has thus been delivered rotates with the rotor 70 past the position in which this fruit was received, the roller 158 is lowered in following the cam 66 so that the cross head 157 of this unit is correspondingly lowered. Fig. 7 illustrates such a unit 90 at the moment when the lowering of the roller 158 thereof by the cam 66 has just resulted in the ejector 93 coming to rest on the rubber cushion 119 at the lower end of the shaft 117 on which that ejector is mounted. The ejector lifting plate 184 continues downwardly moving out of contact with the rubber cushion ring 136 on the ejector 93 as the downward movement of the latter halts.

The upper cup 92 passes down through the stripper 141 and, while still guided by this stripper so as to be accurately aligned with the cup 91, it moves into interdigital relation therewith. This presses the whole citrus fruit F, resting in the cup 91, against the circular knife 100, thereby cutting a button from the rind of the fruit so as to open a passageway for escape of the juice from the interior of the fruit. Almost simultaneously with this action, the fruit is brought into intimate conformation with the adjacent concave surfaces of the cups 91 and 92 so that the rind of the fruit is uniformly supported by these cup surfaces over all portions of the rind excepting the area within the circular knife 100. This support prevents the juice bearing structures inside the rind from bursting outwardly through the rind as a result of the high internal pressure produced by further downward movement of the upper cup 92.

Figure 8:
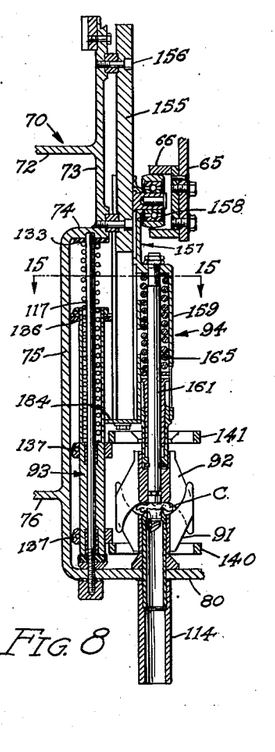
Fig. 8 is a view similar to Fig. 7 and shows the upper cup of said compression unit in its lowermost position in which it cooperates with the lower cup to confine and constrict said citrus fruit so as to extract the juice and rind oil therefrom.

The confining of the juice within the rind so that it is exclusively discharged downwardly through the knife tube 99 and tubular nut 114 into the juice storage 29 of the machine, even although the fruit is reduced to a flattened biscuit-like carcass with the rind superficially shredded as shown in Fig. 8, when the upper cup 92 reaches its downwardmost position, is a strange phenomenon in the operation of extractor 20. The narrow character of the fingers 96 of the cups 91 and 92 and the fact of the rind of the fruit being supported uniformly everywhere except in the area of the circular cutter 100, at points relatively closely spaced, are the factors which apparently make this phenomenon possible. The compression, abrasion and partial shredding of the rind also releases a very large portion of the rind oil from the oil cells of the rind. The feature of thus extracting juice and peel oil by the use of interdigitating compression cups was originated by Wilbur A. Pipkin and is covered by his co-pending application for U. S. Letters Patent, Ser. No. 544,424, filed July 11, 1944, which issued as Patent Number 2,420,679, dated May 20, 1947.

The button cut from the rind of the fruit F by the circular cutter 100 is discharged into the juice trough 29 and is washed therefrom by the juice flowing through the juice outlet port 36 (see Fig. 2).

When the upper cup 92 is lifted by the rising of the roller 158 in the cam 66, this cup passes through the stripper 141 and if by any chance the rind carcass C produced in the compression operation, just completed, tends to stick within the cup 92, it is stripped from this by the stripper 141 and falls back downwardly into the cup 91. As the cup 92 rises through the position in which it is shown in Fig. 7 the ejector lifting plate 184 re-engages the cushion ring 136 and thus picks up the ejector 93 and carries this upwardly with the cross head 157 of this unit. As the lower stripper 140 travels upwardly with the ejector 93, its picks extending between the fingers 96 of the cup 91 engage the rind carcass C in this cup and lift it upwardly above the upper end of the lower cup, as shown in Fig. 9. This operation takes place so that the upward movement of the stripper 140 is completed just before this stripper passes under the scoop 225.

The shear blade 226 of this scoop rests directly in line with the carcass C and the latter collides with this shear blade and is deflected by it from the machine and onto the conveyor belt (not shown) which is preferably provided to carry away these carcasses and the peel oil pulp discharged from the finisher 235.

As shown in Fig. 1, the point where the carcass is thus deflected from the machine is only a short distance from the point where the feeding of a whole fruit to each unit takes place. The cross head 157 is lowered between these two positions so that the lower stripper 140 drops down far enough whereby the lower cup is able to receive the new whole fruit F now fed thereto by the feeder 200 (Figs. 3 and 10).

A complete cycle of operation of one of the extraction units 90 has now been described.

The gaskets 113, 115 and 120 are for the purpose of preventing rind oil, extracted from the peel in the compression operation, from leaking into the juice trough 29 and thus contaminating the juice expressed from the fruit in said operation. It is of the greatest importance not only that a high yield of juice and rind oil be had but that these two ingredients of the fruit be kept separate after their being extracted from the fruit.

The present invention uniformly produces exceptionally high yields of juice and rind oil and each derivative liquid is relatively free of contamination by the other.

It is likewise important to prevent contamination of the juice by the lubricating oil necessary to keep the extractor 20 functioning smoothly, and this is accomplished by the oil retaining flange 27 extending into the annular groove 79 of the bushing 78 so that any oil passing downwardly between the journal 42 and the bushing 78 of the rotor 70 escapes through the vent holes 44 beneath the machine.

In a similar manner, the annular flange 207 prevents oil from the transmission casing 203 from escaping downwardly to contaminate the peel oil.

The pan 228 confines the fumes of peel oil carried out through the housing opening 192 by the gear 265 so that these fumes condense and the condensed oil drips downwardly through the hole 229 into the peel oil finisher 235.

As pointed out hereinabove, the rind of the fruit is superficially shredded (Fig. 8) when the fruit is compressed between the upper and lower cups 91 and 92. Fragments of rind are thus sheared from the fruit being separated from the carcass thereof, and these rind fragments find their way with the rind oil into the rind oil trough 30 in which they are kept agitated by the plow 195 until they are forced out through the port 32 into the finisher 235. Here the pulp represented by these rind fragments is separated from the peel oil in the manner previously described.

While for illustrative purposes a specific embodiment of the invention is shown herein, it is to be understood that this is susceptible of many modifications and changes without departing from the spirit of the invention or the scope of the appended claims.

The claims are:

1. In combination: a rotor; means for rotating said rotor; a series of liquid extracting units on said rotor, each of said units including a pair of cooperating compression cups; means for causing reciprocatory axial movement of one of the cups of each of said units towards and away from the other cup of said unit as said rotor turns, to cause the cups of said unit to enclose and compress a whole citrus fruit to extract a liquid therefrom; ejector means for ejecting the carcass of a fruit from said cups after said compression to permit discharging said carcass out of the machine; and means responsive to the cup of said unit which reciprocates relative to the other cup thereof, to actuate said carcass ejector.

2. In combination: a rotor; means for rotating said rotor; a series of liquid extracting units on said rotor, each of said units including a pair of cooperating compression cups, each of said cups having an annular series of fingers separated by slots so that the fingers of one cup will interdigitate with the fingers of the other cup when the two are brought axially together; means for causing reciprocatory axial movement of one of the cups of each of said units towards and away from the other cup of said unit as said rotor turns, to cause the cups of said unit to come into interdigitating relation and to enclose and compress a whole citrus fruit to extract a liquid therefrom; an ejector for each unit, said ejector operating within the slots between the fingers of the cups of said unit for ejecting from said cups the carcass of a fruit after its compression between said cups, to permit discharging said carcass out of the machine; and means responsive to said movement of the reciprocating cup of each of said units to actuate the carcass ejector thereof.

3. A combination as in claim 2, in which said carcass ejector includes an individual ejector for each of said cups; and means for guiding said carcass ejector for movement axially with respect to said compression cups in response to movement of said reciprocating cup.

4. In combination: a rotor; means for rotating said rotor; a series of liquid extracting units on said rotor, each of said units including a pair of cooperating compression cups, each of said cups having an annular series of fingers separated by slots so that the fingers of one cup will interdigitate with the fingers of the other cup when the two are brought axially together; means for causing reciprocatory axial movement of one of the cups of each of said units towards and away from the other cup of said unit as said rotor turns, to cause the cups of said unit to come into interdigitating relation and to enclose and compress a whole citrus fruit to extract a liquid therefrom; an ejector means for each of said units for ejecting from the cups thereof the carcass of a fruit following compression of the latter between said cups, said means including an individual stripper for each of said cups, each of said strippers having picks extending into the slots between the fingers of said cups, said strippers being united in rigid spaced relation; means mounting the strippers of each unit for sliding axial movement relative to the cups thereof; and means for actuating said ejector means coordinately with the axial movement of said reciprocating cup of said unit to perform a stripping action successively with respect to the two cups of said unit to strip the fruit carcass from both of said cups following each compression operation by said cups and prior to the beginning of the next compression operation.

5. In combination: a rotor; means for rotating said rotor; a series of liquid extracting units on said rotor, each of said units including a pair of cooperating compression cups, each of said cups having an annular series of fingers separated by slots so that the fingers of one cup will interdigitate with the fingers of the other cup when the two are brought axially together; means for causing reciprocatory axial movement of one of the cups of each of said units towards and away from the other cup of said unit as said rotor turns, to cause the cups of said units to come into interdigitating relation and to enclose and compress a whole citrus fruit to extract a liquid therefrom; and an ejector for each of said units for ejecting from the lower cup thereof the carcass of a fruit following compression of the latter between said cups, said means for reciprocating one of said cups relative to the other also causing relative axial movement between said lower cup and said ejector to accomplish said ejection of said carcass, said ejector comprising a stripper plate with a flat upper surface, the outer portion of which surrounds said cup and is provided with picks extending inwardly in the plane of said plate through the slots of said lower cup, the upper surface of said plate rising above the upper ends of the fingers of said lower cup when in carcass ejecting position.

6. In combination: a rotor; means for rotating said rotor; a series of liquid extracting units on said rotor, each of said units including a pair of cooperating compression cups; each of said cups having an annular series of fingers separated by slots so that the fingers of one cup will interdigitate with the fingers of the other cup when the two are brought axially together; means for causing reciprocatory axial movement of one of the cups of each of said units towards and away from the other cup of said unit as said rotor turns, to cause the cups of said units to come into interdigitating relation and to enclose and compress a whole citrus fruit to extract a liquid therefrom; an ejector for each of said units for ejecting from the lower cup thereof the carcass of a fruit following compression of the latter between said cups, said means for reciprocating one of said cups relative to the other also causing relative axial movement between said lower cup and said ejector to accomplish said ejection of said carcass, said ejector comprising a plate with a flat upper surface, the outer portion of which surrounds said cup and is provided with picks extending inwardly in the plane of said plate through the slots of said lower cup, the upper surface of said plate rising above the upper ends of the fingers of said lower cup when in carcass ejecting position; and a stationary scoop extending into the space between the cups of each of said units, at the time when the ejector thereof is in ejecting position, and downward close to the level of the upper surface of said ejector at said time, said scoop being adapted to intercept and deflect from the machine the fruit carcass resting on top of the ejector of each unit as said ejector passes under said scoop.

7. In combination: a rotor; means for rotating said rotor; a series of liquid extracting units on said rotor, each of said units including a pair of cooperating compression cups, each of said cups having an annular series of fingers separated by slots so that the fingers of one cup will interdigitate with the fingers of the other cup when the two are brought axially together; means for causing reciprocatory axial movement of one of the cups of each of said units towards and away from the other cup of said unit as said rotor turns, for the purpose of causing the cups of said units to come into interdigitating relation and to enclose and compress a whole citrus fruit to extract a liquid therefrom; and means extending into the slots in said cups of each of said units for ejecting the fruit carcass from said cups, said ejecting means guiding the reciprocating cup of said unit to align it for readily entering interdigital relation with the other cup of said unit.

8. In combination: a rotor; means for rotating said rotor; a series of liquid extracting units on said rotor, each of said units including a pair of cooperating compression cups, each of said cups having an annular series of fingers separated by slots so that the fingers of one cup will interdigitate with the fingers of the other cup when the two are brought axially together; means for causing reciprocatory axial movement of one of the cups of each of said units towards and away from the other cup of said unit as said rotor turns, for the purpose of causing the cups of said unit to come into interdigitating relation and to enclose and compress a whole citrus fruit to extract a liquid therefrom; and a carcass ejector for each of said units, said ejector having a stripper for each of the cups of said unit with picks extending with close fit between the fingers of said cups, and having means rigidly uniting said strippers in true axial relation whereby said ejector guides the reciprocating cup of said unit to maintain it approximately in axial alignment with the other cup of said unit and rotationally indexed to be ready to enter in interdigital relation with said other cup.

9. A combination as in claim 8 having means maintaining the picks of both of said strippers always in meshing relation with the fingers of both of said cups while said cups are out of interdigital relation.

10. A combination as in claim 8 having means for guiding said ejector for movement parallel with the axis on which said cups meet in interdigitating relation; and means responsive to movement of said reciprocating cup for shifting said ejector on its guide means to cause said ejector to successively strip said carcass from said reciprocating cup and then strip said carcass from the other cup of said unit.

11. In combination: a rotor; means for rotating said rotor; a series of units circumferentially arranged on said rotor, each of said units including a pair of cooperating compression cups for extracting liquid from a whole citrus fruit; means for closing and opening the cups of each of said units relative to each other to enclose and compress a whole citrus fruit to extract liquid therefrom; means for stripping the carcass of a whole fruit after compression from said cups into a position between said cups with the latter separated following said compression; and a stationary member for engaging each such carcass as it is thus positioned, said member being inclined to deflect said carcass from the machine without assistance.

12. In combination: a rotor; means for mounting and rotating said rotor on a vertical axis; a series of extraction units on said rotor, each of said units including a lower cup fixed on said rotor on a vertical axis; an upper cup slideably mounted on said rotor co-axially with said lower cup, each of said cups having an annular series of fingers separated by slots so that the fingers of one cup will interdigitate with the fingers of the other cup when the two are brought axially together; cam means responsive to the rotation of said rotor to reciprocate the upper cup of each of said units downwardly into interdigital relation with the lower cup of said unit to enclose and compress a whole citrus fruit for the extraction of liquid therefrom; an ejector for each of said units having a stripper for each of the cups thereof, the stripper for each cup having picks extending between the fingers of said cup, and means rigidly uniting said strippers spaced in co-axial relation; means for guiding the ejector of each unit for sliding movement parallel with the axis of interdigitation of said unit and means carried by said upper cup of each unit for shifting said ejector so that the strippers thereof travel co-axially with said cups and maintain said cups in proper rotational relation; and means for holding said ejector in a lower position to cause the stripper for said upper cup to strip the carcass therefrom before said ejector is engaged by the aforesaid means on said upper cup for moving the same, said ejector lifter being raised along with said upper cup to lift said ejector with said upper cup and thereby accomplish the stripping of the carcass from the lower cup of said unit by the stripper of said lower cup.

WERNER R. HOFMANN.

REFERENCES CITED

The following references are of record in the file of this patent:

UNITED STATES PATENTS

| Number | Name | Date |
| --- | --- | --- |
| 2,420,679 | Pipkin | May 20, 1947 |